United States Patent
Ekchian et al.

(10) Patent No.: US 12,319,184 B2
(45) Date of Patent: Jun. 3, 2025

(54) METHOD AND APPARATUS FOR STATE BASED CONTROL OF ACTIVE PLATFORMS

(71) Applicant: ClearMotion Acquisition I LLC, Billerica, MA (US)

(72) Inventors: Jack A. Ekchian, Belmont, MA (US); Ari Gordin, Medford, MA (US); Pankaj Chopra, Watertown, MA (US); Zackary Martin Anderson, Cambridge, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 754 days.

(21) Appl. No.: 17/055,219

(22) PCT Filed: May 14, 2019

(86) PCT No.: PCT/US2019/032130
§ 371 (c)(1),
(2) Date: Nov. 13, 2020

(87) PCT Pub. No.: WO2019/222156
PCT Pub. Date: Nov. 21, 2019

(65) Prior Publication Data
US 2021/0221258 A1 Jul. 22, 2021

Related U.S. Application Data

(60) Provisional application No. 62/726,129, filed on Aug. 31, 2018, provisional application No. 62/671,668, filed on May 15, 2018.

(51) Int. Cl.
*B60N 2/809* (2018.01)
*B60N 2/00* (2006.01)
(Continued)

(52) U.S. Cl.
CPC .......... *B60N 2/809* (2018.02); *B60N 2/0022* (2023.08); *B60N 2/0025* (2023.08);
(Continued)

(58) Field of Classification Search
CPC ........ B60N 2/0244; B60N 2/002; B60N 2/12; B60N 2/143; B60N 2/20; B60N 2/501;
(Continued)

(56) References Cited

U.S. PATENT DOCUMENTS

| 5,822,707 A | 10/1998 | Breed et al. |
| 2006/0095180 A1 | 5/2006 | Ummethala et al. |

(Continued)

FOREIGN PATENT DOCUMENTS

| CN | 107054261 A | 8/2017 |
| DE | 10 2015 216 100 A1 | 3/2017 |

(Continued)

OTHER PUBLICATIONS

English translation of EP 0191272 A1 (Year: 1986).*
(Continued)

*Primary Examiner* — Shon G Foley
(74) *Attorney, Agent, or Firm* — Wolf, Greenfield & Sacks, P.C.

(57) ABSTRACT

Embodiments related to systems and methods for controlling an active vehicle seat are described. In some embodiments, the active vehicle seat is controlled based at least partly on internal sensor information, external sensor information, and operator input from a user interface.

28 Claims, 13 Drawing Sheets

(51) Int. Cl.
*B60N 2/02* (2006.01)
*B60N 2/12* (2006.01)
*B60N 2/14* (2006.01)
*B60N 2/20* (2006.01)
*B60N 2/50* (2006.01)
*B60N 2/75* (2018.01)
*B60N 2/90* (2018.01)
*B60N 3/00* (2006.01)

(52) U.S. Cl.
CPC ......... *B60N 2/0027* (2023.08); *B60N 2/0244* (2013.01); *B60N 2/12* (2013.01); *B60N 2/143* (2013.01); *B60N 2/20* (2013.01); *B60N 2/501* (2013.01); *B60N 2/767* (2018.02); *B60N 2/976* (2018.02); *B60N 2/995* (2018.02); *B60N 3/002* (2013.01); *B60N 2/0268* (2023.08); *B60N 2210/40* (2023.08)

(58) Field of Classification Search
CPC ........ B60N 2/767; B60N 2/809; B60N 2/976; B60N 2/995; B60N 3/002; B60N 2/0268; B60N 2/0272; B60N 2/06; B60N 2/062; B60N 2002/0055; B60N 2/10; B60N 2/14; B60N 2/24; B60N 2/39; B60N 2/42; B60N 2/50; B60N 2/99
See application file for complete search history.

(56) References Cited

U.S. PATENT DOCUMENTS

| | | |
|---|---|---|
| 2006/0200287 A1 | 9/2006 | Parison et al. |
| 2007/0276568 A1 | 11/2007 | Tozu |
| 2010/0276973 A1 | 11/2010 | Zenk et al. |
| 2011/0043018 A1* | 2/2011 | Maeda ................. B60N 2/36 297/340 |
| 2011/0080290 A1 | 4/2011 | Baxi et al. |
| 2012/0001463 A1 | 1/2012 | Breed et al. |
| 2013/0275006 A1 | 10/2013 | Ystueta |
| 2021/0086662 A1* | 3/2021 | Gempel ............. B60N 2/02246 |

FOREIGN PATENT DOCUMENTS

| | | | |
|---|---|---|---|
| EP | 0191272 A1 * | 8/1986 | ........... B60N 2/0228 |
| EP | 2 431 218 A1 | 3/2012 | |
| WO | WO 2013/006639 A1 | 1/2013 | |

OTHER PUBLICATIONS

International Search Report and Written Opinion for International Application No. PCT/US2019/032130 mailed Jul. 19, 2019.

* cited by examiner

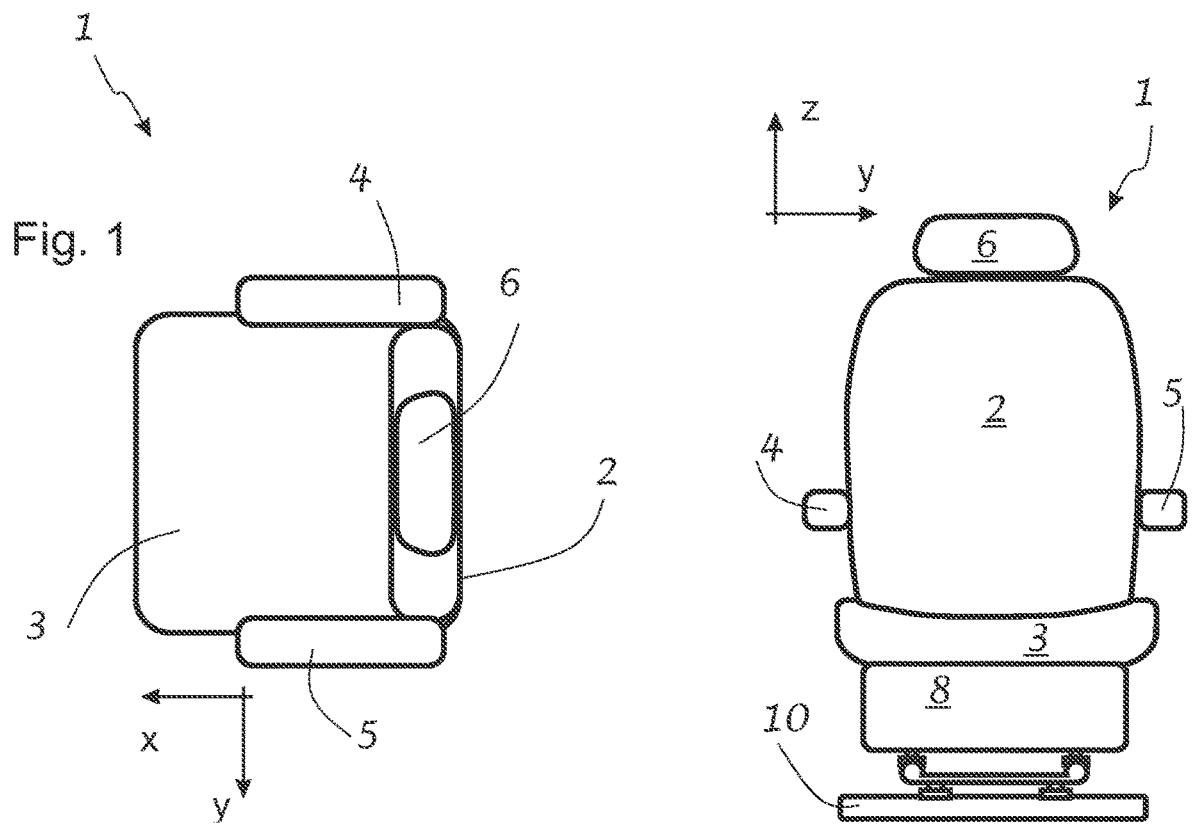
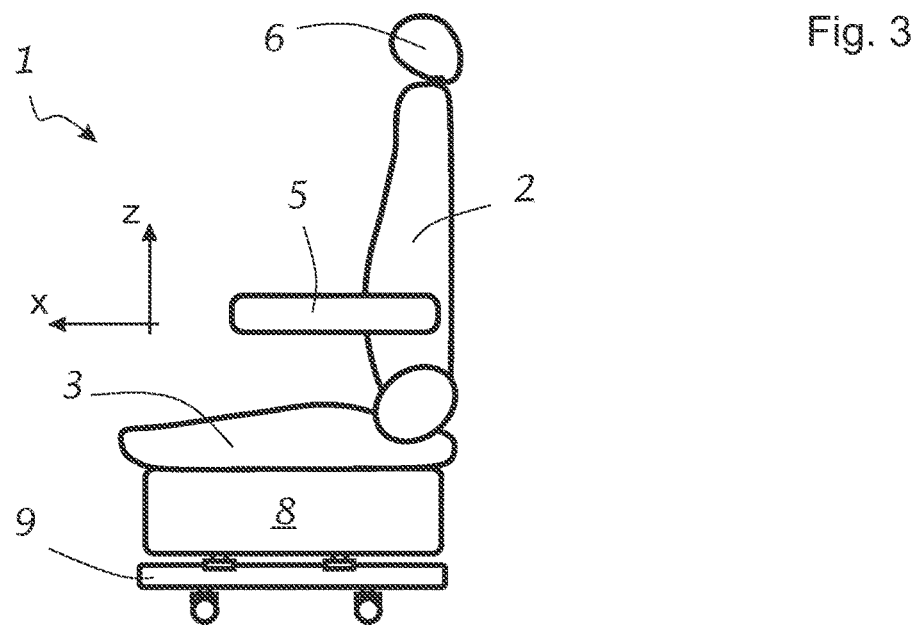

METHOD AND APPARATUS FOR STATE BASED CONTROL OF ACTIVE PLATFORMS

CROSS-REFERENCE TO RELATED APPLICATIONS

This application is a national stage filing under 35 U.S.C. § 371 of International Patent Application Serial No. PCT/US2019/032130, filed May 14, 2019, which claims the benefit of priority under 35 U.S.C. § 119 (e) of U.S. Provisional Application Ser. No. 62/671,668, filed May 15, 2018, and Provisional Application Ser. No. 62/726,129, filed Aug. 31, 2018, the disclosures of each of which are incorporated by reference in their entirety.

FIELD

Disclosed embodiments are related to systems and methods for controlling an active seat in a vehicle.

BACKGROUND

Vehicles are subjected to various motion inputs as they are operated in on-road or off-road environments. For example, as a vehicle is driven down a road, external disturbances may induce motions and accelerations in the vehicle. Accordingly, conventional vehicles include suspension systems such as passive, semi-active, or active suspension systems to mitigate at least a portion of these disturbances that may be transmitted to the frame of the vehicle. If not sufficiently mitigated, such disturbances may result in an unsafe, uncomfortable or unpleasant ride for vehicle occupants.

SUMMARY

A method for controlling an active seat in a vehicle equipped with an active seat controller that includes one or more predefined control parameters. The method may include commanding one or more actuators of the active seat suspension, in response to one or more sensor signals, to move the seat based at least partially on the one or more control parameters. In certain embodiments the controller provides a command signal to at least one actuator. The method may further include obtaining information about a state and/or environment of the seat and modifying at least one control parameter of the controller based at least in part on the information about the state and/or environment of the seat. Information about the state of the seat may include, without limitation, information about the orientation, position, and configuration of the seat. Information about the environment of the seat may include, without limitation, information about the fixed (e.g., dash board, pillar, other fixed seats), adjustable (e.g., steering wheels, other adjustable seats), vehicle occupants, and/or various removable objects or cargo that may interfere with the motion of the seat.

The term "seat" as used herein is intended to mean, unless context requires otherwise, any platform that may support a person in any desired orientation. For example, in some embodiments, the term "seat" may describe a bed, a seat that may be converted to a bed, an operating platform, a gurney, or any other means of supporting a person. The term "vehicle" as used herein is intended to mean, unless context requires otherwise, any transportation means capable of transporting a person. For example, in some embodiments, the term "vehicle" may describe a bus, a train, an airplane, and a boat.

The seat controller may be configured to adjust or limit one or more aspects of the motion (including, for example, magnitude, range of motion, and/or frequency of heave, pitch and/or roll) of the seat based on information about the state of the seat. In some embodiments, the controller may eliminate motion or certain aspects of motion based at least partially on the state of the seat. For example, when the controller receives information that the seat back of the active seat is reclined by a certain amount or is at a certain angle, the controller may use that information to modify at least one control parameter of the controller. The controller with the at least one modified control parameter, may then constrain or limit, for example, the magnitude of heave, pitch and/or roll, of the seat relative to the vehicle body or relative to other items in the passenger compartment or cabin of the vehicle. In some embodiments, for example, when the seat back is reclined, the maximum roll motion in one or more directions relative to the vehicle body may be increased compared to when the seat is in a predetermined base state. In some embodiments, for example, if the seat is oriented in a non-forward-facing direction, the controller may fully disable or partially limit the operation of one or more active suspension actuators of the active seat suspension. In some embodiments, the controller may modify one or more parameters of the controller based on information about the state of the active seat and/or the vehicle, and then operate the seat based on these modified parameters. In some embodiments, the value(s) of the one or more adjusted parameters of the controller may be returned to their predetermined base values when the seat configuration, orientation and position are returned to their base state.

In some embodiments, a system for actively suspending a seat in a vehicle may include a seat suspension with at least one actuator and a transmission element, where the seat suspension is constructed and arranged to move the seat with at least one degree of freedom. The system may also include at least one seat state sensor constructed and arranged to output information indicating a value of a seat state parameter, such as for example, information about the orientation, position, and/or configuration of the seat relative to a predefined base state, relative to the vehicle body, and/or relative to an item in the vehicle, and a seat control unit may be constructed and arranged to receive information from the at least one seat state sensor to provide a command signal to an actuator in order to control the seat based at least partly on one or more control parameters. The control unit may be constructed and arranged to adjust at least one control parameter based at least partly on the information about the state of the seat.

In certain embodiments, a system for actively suspending and/or supporting a seat in a vehicle may include a seat suspension with at least one actuator and a transmission element, where the seat suspension is constructed and arranged to move the seat with at least one degree of freedom relative to the vehicle body. The system may also include at least one seat state sensor constructed and arranged to output information about the state of the seat and a control unit constructed and arranged to receive information from the at least one seat state sensor. In at least some embodiments, the controller may control at least one actuator based at least partly on a predetermined operational envelope for the particular state of the seat reported to the controller. In some embodiments, the control unit may be constructed and arranged to adjust the permitted operational envelope based on the information from one or more sensors or from a user interface available to, for example, a vehicle occupant.

In certain embodiments, an active seat controller may operate adjustable seats that may be adjusted by a vehicle occupant either manually or by using switch activated powered adjustment actuators. For example, certain active seats may include adjustable headrests that may be raised or lowered manually or by using a switch activated electric motor. Additionally or alternatively, in certain embodiments of active seats, the seat may be inclined, relative to the vehicle, to various degrees, either manually or by using a switch activated electric motor. Additionally or alternatively, in certain embodiments the seat may be moved translationally forward, backward, and/or sideways or rotated from a forward facing direction to a backward facing direction or any intermediate point. In certain embodiments, where an active seat may be translationally or rotatably displaced relative to the vehicle, at least a portion of the active suspension may move with the seat or the seat may move relative to the active suspension system.

In certain embodiments, the active seat controller may receive information about the location of fixed, adjustable, and/or removable objects in the environment within the vehicle. For example, an active seat controller may receive information, from one or more sensors, about the position of an adjustable item such as, for example, an adjustable steering wheel, and other adjustable seats. Additionally or alternatively, an active seat controller, may receive information stored in a database stored on data storage device, such as, for example a computer disk drive and the cloud, about the relative position of one or more objects in the seats environment. Alternatively or additionally, an active seat controller may receive information about a maximum amount of movement in at least one degree of freedom for at least one state of the active seat. In certain embodiments, a controller of an adjustable active seat may adapt the operation of an active seat suspension based at least on: information about the seat's environment obtained from a database, information about the seat's environment obtained from a sensor, information about the orientation of the seat relative to the vehicle, information about, the position of the seat relative to the vehicle, and/or based on the configuration of the seat.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 1 is a top view of an embodiment of an adjustable active seat;

FIG. 2 is a side view of an embodiment of an adjustable active seat;

FIG. 3 is a front view of an embodiment of an adjustable active seat;

DETAILED DESCRIPTION

Figure 4:
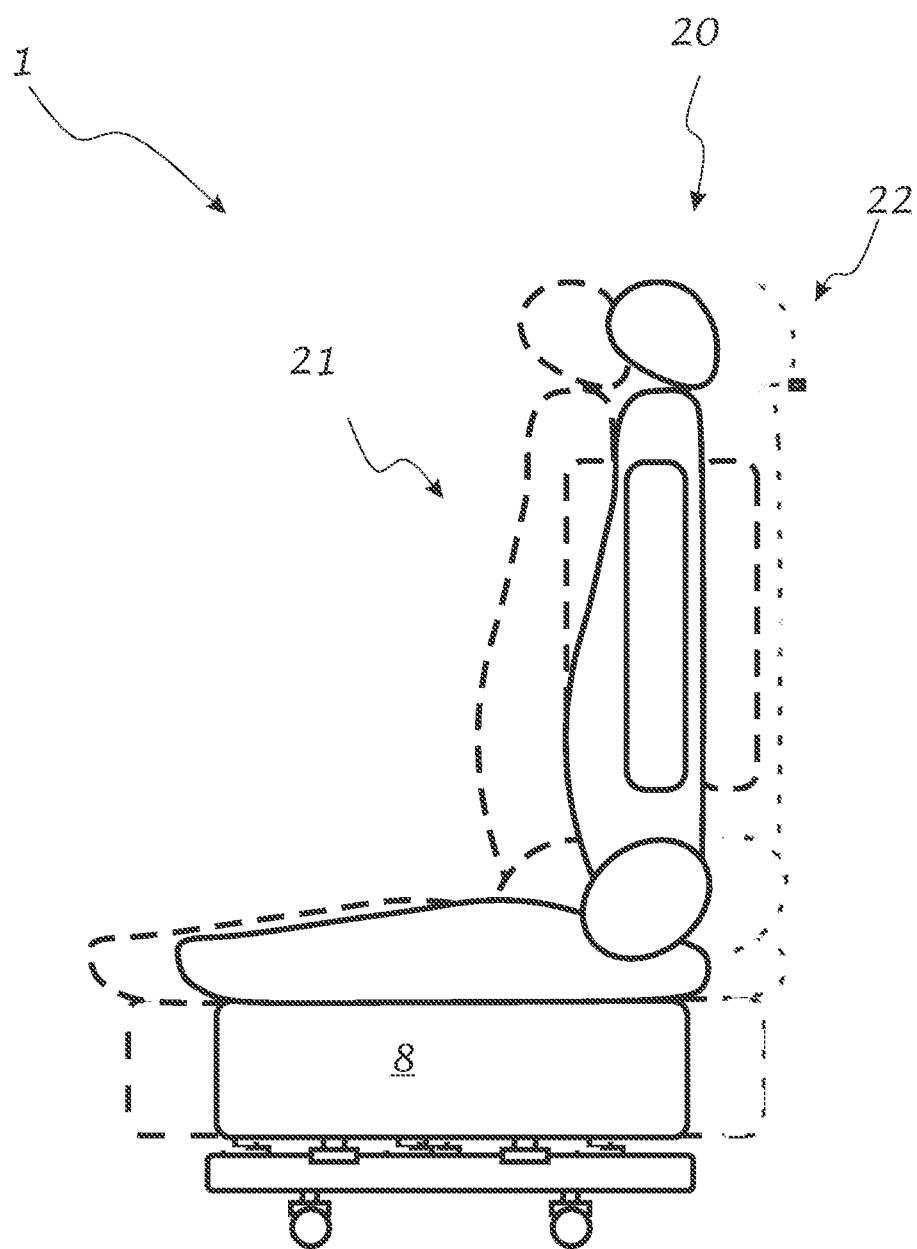
FIG. 4 is an embodiment of an adjustable active seat showing translationally distinct positions in the x direction.

To help mitigate the effect of certain accelerations, displacements, or other disturbances that occur during operation of a vehicle on an occupant of the vehicle, the vehicle may include an active suspension system interposed between a seat in the vehicle and, for example, the vehicle's chassis, frame, floor or body. The active suspension system of an actively suspended seat may be configured to reduce or induce seat motion in the absolute reference frame including, for example, in heave, roll, and/or pitch. Actively suspended seats (which may be alternatively referred to as "active seats") may operate within a specific operating envelope which may be pre-programmed or may be determined by the physical range of motion of one or more actuators moving the seat. Alternatively, as described herein, the operating envelope may be dynamically determined based on a variety of conditions.

In many cases, active seats operate in an environment in a vehicle that may not be constant. For example, the state of the seat may change, and/or one or more objects and/or occupants within the vehicle interior may be moved relative to each other. In some embodiments, such changes may need to be considered when operating an active seat in order to avoid collision between the seat and/or the occupant of the seat and other objects in the passenger compartment of the vehicle. In some embodiments, the state of an adjustable active seat may be altered by an occupant of the seat (for example, by adjusting the orientation, position, and/or configuration of the seat) in a particular manner, e.g. to increase their own comfort and/or convenience, the comfort and/or convenience or another occupant, and/or for any other reason.

Additionally, users of an active seat may have different sensitivities to movements in one or more directions. For example, an occupant of an active seat, such as a driver or a person with a particular medical condition, such as, for example, a back ailment, may prefer more roll isolation than heave, and others may prefer more heave isolation than roll. Additionally, it may be desirable to adjust sensitivity or gain of vibration isolation in different frequency ranges. As an example, it may be preferable to isolate only high frequency vibrations when a child safety seat is in the active seat. Accordingly, it may be desirable for an occupant of a seat to use a user interface to operate the seat in one or more different modes.

Additionally, some desirable features such as massaging functions in an active seat may induce vibrations in the seat that the active seat controller may need to ignore, i.e., not respond to. For example, in an active seat with a massaging option, the controller may be configured to ignore or limit the response of one or more actuators to sensor inputs that correlate with motion induced by the massaging system.

In view of the above, the inventors have recognized the benefits of an active seat control unit that controls the seat based on one or more of the foregoing considerations. For example, the control unit may receive input from one or more sensors that may provide information about the orientation of the active seat, e.g., the sensors may detect the direction the seat is facing (e.g., facing forward, sideways, or backwards), and/or that the seat is reclined or by how much it is reclined. The inventors have also recognized the benefits of an active seat control unit that controls the seat at least partly based on input from one or more sensors that indicate the location, orientation and/or the size of an adjustable proximate object. The seat control unit may control the movement of the seat, for example, to prevent collision or interference between any part of the active seat and such objects or items. Additionally, the inventors have recognized the benefits of an active seat control unit which controls the seat based on input from one or more sensors and/or user interfaces that provide information about the state of the active seat (also referred to herein as internal factors) and/or surroundings of the seat (also referred to herein as external factors).

Figure 5:
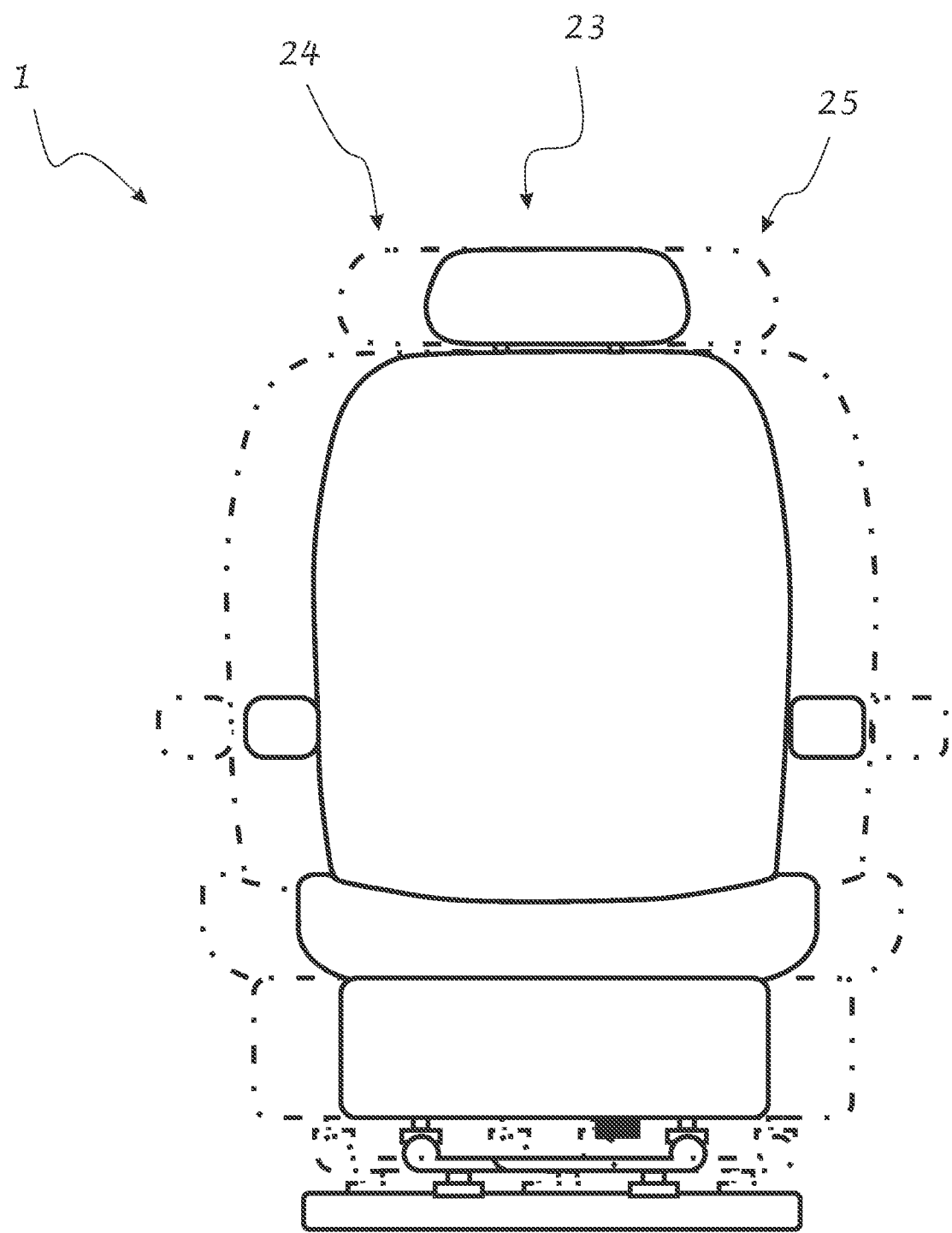
FIG. 5 is an embodiment of an adjustable active seat showing translationally distinct positions in the y direction.
Figure 6:
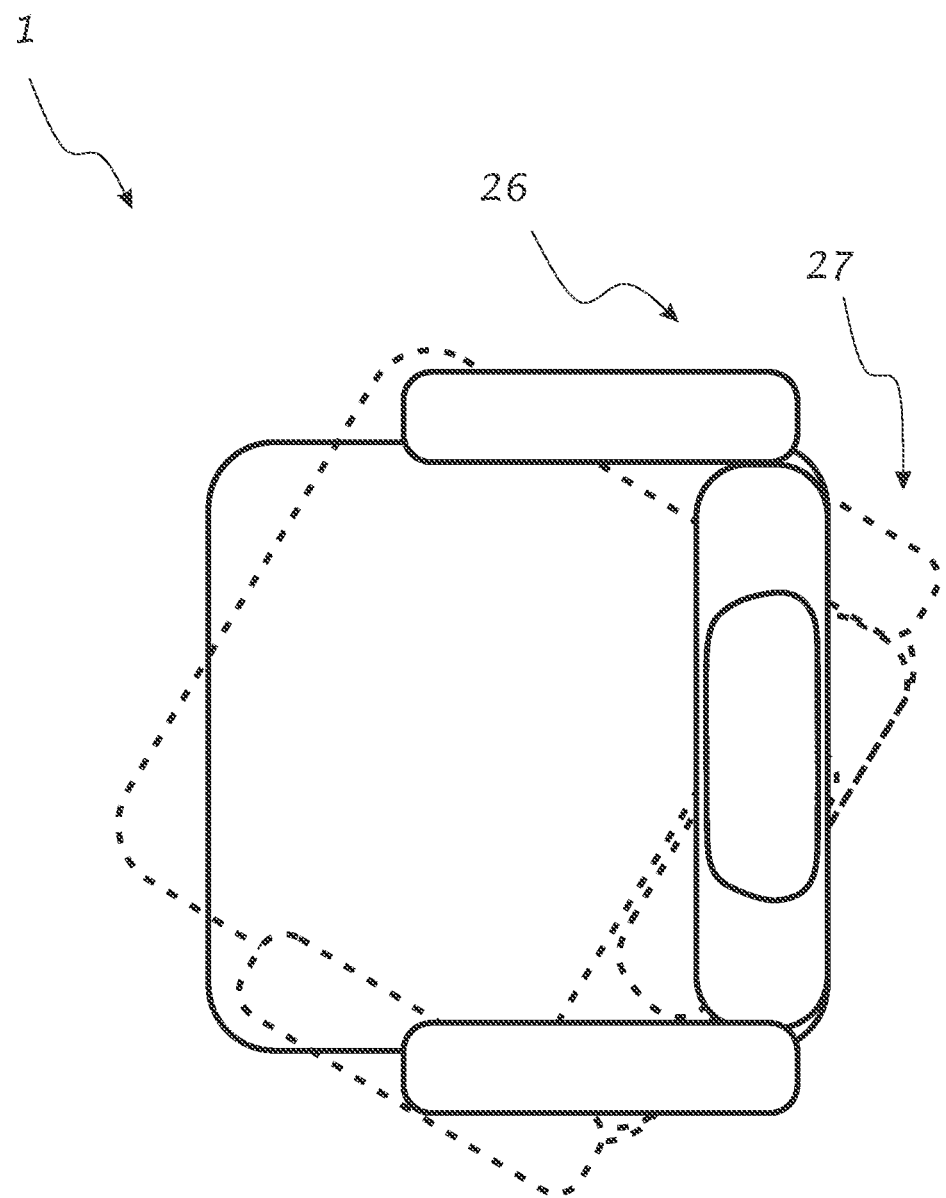
FIG. 6 is an embodiment of an adjustable active seat showing two rotationally distinct positions about the axis in the z direction.

In some embodiments, a method for controlling an adjustable active seat includes obtaining information about changes in the state of the active seat relative to at least one predefined base state of the active seat. In some embodiments, the state of an active seat may be adjusted, for example, manually or by using switch activated powered adjustment mechanisms to adjust the:

position of the active seat by translating it, relative to a base state and/or the vehicle, in the fore-aft direction (sometimes referred to in the art as the "x" direction) (See FIG. 4, the lateral direction (sometimes referred to in the art as the "y" direction) (See FIG. 5, and/or along an axis perpendicular to the x and y directions (sometimes referred to in the art as the "z" direction)

orientation of the active seat, by rotating the seat, relative to a base state and/or the vehicle, about the z axis (See FIG. 6)

configuration of the seat by changing its contours relative to a base state by, for example, reclining the seat back, inclining the seat cushion, and rearranging the headrest, and deploying an attached work surface, attached arm rests and/or foot rests (if available) (See FIGS. 7-11)

In some embodiments, one or more active suspension actuators may be utilized to move an active seat, for example, in an adjusted state, relative to the vehicle. But in certain embodiments, the range of motion may be limited depending on the particular state of the seat. In some embodiments, limits may be set in order to, for example, avoid collisions or interferences from occurring between the seat and/or occupant of the seat with other objects, such as for example, parts of the vehicle or objects in the passenger compartment of the vehicle. The range of motion may be limited as compared to when the active seat is in a predefined "base state" wherein, in the base state, parameters that define the relative position, orientation and/or configuration of the seat may have predefined base values. For example, the base state of an active seat may be where the seat is facing in the forward direction, e.g., at zero degrees of rotation about to the z axis ("base orientation"), the seat is at the mid-point of its range of motion along the x, y, and z directions, ("base position"), and the configuration of the seat is such that the arm rests (if any), headrest (if any), deployable tray (if any), and a deployable foot rest (if any) are in a full retracted position, the seat back is in the full upright position and the seat cushion is at the mid-point of its range of travel ("base configuration"). The base state of the seat may be defined by values of these and other state parameters as the disclosure is not so limited. In certain embodiments, the orientation, position, and/or configuration of an active seat in any particular state are determined in comparison to the predefined base state.

As used herein, the base state may be a pre-defined reference position relative to which the seat may vary in configuration, position, and/or orientation. In certain embodiments, the method further includes adjusting one or more control parameters of the active seat controller based at least partly in response to changes to one or more of the seat's orientation, position and/or configuration. The method may also include determining a control signal based at least in part on the one or more control parameters, and providing the command signal to one or more actuators of the active seat. Without wishing to be bound by theory, the method may allow the command signal to be dynamically updated or adjusted based on any changes to the position, orientation, and/or configuration of the adjustable active seat, such that control parameters may be reconfigured to be suitable for control of the seat with the new orientation, position, and/or configuration. Accordingly, the method allows for a plurality of factors to be considered dynamically as the seat experiences changes to better improve control of the active seat or to preclude undesirable interferences between the seat and/or seat occupant with other items. For example, in certain embodiments, in response to detecting that a seat back has been modified from an upright configuration to a reclined configuration, one or more of the control parameters of the seat controller may be modified. In certain embodiments, when the seat configuration is adjusted by reclining the seat back, there may be additional room in the vehicle to accommodate rotation of the seat about a roll axis, so that the maximum allowed roll angle parameter of the seat controller may be increased (that is, the working envelope of the system may change based on changes in an angle of reclination of the seat). In some embodiments, however, when the seat back is reclined, the allowed heave motion of the active seat may need to be limited to, for example, avoid interference with objects behind the seat. In some embodiments, if a position and/or orientation change of the seat occurs, the limits of the motion of the active seat relative to the vehicle, in one or more directions, may be adjusted such that the seat does not impact or interfere with any other object in the vehicle.

In some embodiments, a method for controlling an active seat may include a control unit with a microprocessor and electronic circuitry that receives information about the active seat (i.e., internal factors) and/or its surroundings (i.e., external factors). The internal factors may include data about, for example, the position, orientation, and/or the configuration of the seat. The external factors may include the position and extent of items within the passenger compartment of the vehicle that may interfere with the motion of the active seat, or an occupant therein, relative to the vehicle. Such information may be collected by using at least one of: external sensors, internal sensors, user interfaces, and databases that contain data about the seat and/or the seats environment. For example, the external sensor may be a three dimensional (3D) sensor arranged to map the passenger compartment of the vehicle and determine the position of items in the passenger compartment. The internal sensor is a sensor that provides information about the state of the adjustable active seat, such as, for example, the orientation, position, and/or configuration or the seat. In some embodiments, the method may include using a two or three dimensional kinematic model of the seat and/or the environment to compute distances between one or more parts of the active seat and items in the surroundings for one or more positions, orientations and/or configurations of the seat.

Alternatively or additionally, a sensor and/or user interface may indicate other aspects of the state of the seat, such as for example, whether: a massaging feature of the seat is turned on, the seat is occupied by an infant or child, and the seat is occupied by a person with a medical condition, such as a back condition. Accordingly, data from one or more sources may inform changes to one more control parameters that determine the operation of the controller or response of the seat active suspension to various road or travel induced motions.

In some embodiments, an active suspension system for actively suspending a seat in a vehicle includes a set of actuators which is arranged to move the seat in at least two degrees of freedom (e.g., roll and heave, pitch and heave) relative to the vehicle. The system may additionally include one or more orientation sensors, position sensors, and/or configuration sensors for outputting information indicating the orientation, position, and/or configuration of the seat, respectively. In certain embodiments, the system further includes a control unit, which may include a microprocessor configured to receive the information from one or more of the sensors and provide one or more command signal, at least partly based on the information, to one or active suspension actuators. The information may include data about the orientation, position, configuration and/or other state of the seat. As the information is incorporated into the process of determining a command signal, the control unit may compensate for any change in the state of the seat to retain desirable and/or appropriate vibration isolation of the seat in its new state. Accordingly, the system may be capable of modifying control parameters based on a state parameter of the active seat so that a plurality of factors may be accounted for, which may improve the control and operation of the active seat suspension system.

In some embodiments, the system may further include an external sensor, an internal sensor, and/or a user interface. Similar to some embodiments discussed previously, the external sensor, internal sensor, and/or user interface may output information that indicates at least one factor to be considered in modifying one or more control parameters which are used to determine a command signal provided to at least one actuator of the active seat suspension. Additionally, the seat control unit may incorporate information about other objects or vehicle components that are proximate to the active seat, such as for example, their size, orientation, and/or location. The active seat controller may also receive information regarding various operating modes of the active seat. Without wishing to be bound by theory, incorporation of additional information regarding external or internal factors in a dynamic manner allows the seat to quickly respond and adjust to any intentional or unintentional change in the operating environment of the active seat.

According to one aspect, a control unit may adjust one or more control parameters in response to and/or based at least partly on information provided by one or more state sensors indicating one or more internal factors of the seat. For example, limits on the magnitude of motion of the seat in heave (i.e., motion in the z direction), roll (i.e., rotation about a longitudinal axis in the x direction), and/or pitch (i.e., rotation about a transverse axis in the y direction) may be imposed to set a maximum value of motion depending on the state of the seat. In some embodiments, the amplitude of motion, relative to the vehicle, induced by the seat active suspension may be limited to a preset value for one or more orientations, positions, and/or configurations of the seat. Such a preset maximum may be any appropriate value including zero. If, for example, the maximum amplitude limit imposed based on a particular orientation of the seat is zero, the movement of the seat in roll, pitch and/or heave may be disabled. For example, the maximum value in the z direction may be set at zero if the seat is reclined beyond a certain angle. Another control parameter that may be adjusted is the response speed of the active seat. For example, if the seat is fully reclined, the control unit may adjust the response to be slower in roll to mitigate shifting the seat occupant. Of course, the control unit may adjust any control parameter that may change the operation of the seat based on information about the orientation, position, configuration, and/or another state parameter of the active seat.

In some embodiments, an active seat may be moveable relative to the vehicle. For example, it may be possible to change the position of the seat by translating the seat forward or backward within the passenger compartment of the vehicle, or by translating the seat from left to right within the passenger compartment of the vehicle. Likewise, it may be possible to change the orientation of the seat, by rotating the seat within the passenger compartment about an axis in the Z-direction. In certain embodiments, the actuators of the active suspension of the seat may move or rotate with the seat when the position and/or orientation of the seat is changed. For example, in certain embodiments, when the state or orientation of the seat is adjusted by rotating the seat about an axis in the z direction, or when the position of the seat in the passenger compartment is adjusted by translating laterally (in the x direction) or longitudinally (in the y direction), one or more of the actuators of the active suspension system move with the seat. In alternate embodiments, the seat may move or rotate independently of the actuators. In these embodiments, when the state of the seat is adjusted by rotating the seat about an axis in the z direction, thereby changing the orientation of the seat, or translated laterally (in the x direction) or longitudinally (in the y direction) to a new position relative to the vehicle, actuators of the active suspension system do not move with the seat.

According to yet another aspect, a control unit may adjust one or more control parameters in response to and/or based at least partly on information indicating the position, proximity, or location of other items or occupants in the vehicle, relative to the actively controlled seat. In some embodiments an external sensor such as an ultrasonic sensor, stereoscopic camera, range camera, or other ranging device may be used to map a vehicle passenger compartment. As used herein, an external sensor is a sensor that provides information about the surroundings of the seat. The map may be used to determine the position of vehicular components, seat components, occupants, and cargo items that may fall within a maximum range of range of motion of the active seat. Accordingly, the control unit may adjust one or more control parameters such as limits on motion in one or more directions to prevent the seat, or an occupant seated in the seat, from colliding with other objects, structures or persons in the vehicle. For example, the external sensor may indicate a position of an adjustable steering wheel, and the limit of the seat may be adjusted by the control unit to prevent the seat from contacting the steering wheel. The adjustment of the limit of the seat may be different depending on if the seat is facing forward or backward. Of course, the external sensor may be any suitable sensor for detecting the distance between a point on the active seat and a point on another object or person in the vehicle that is proximate to the seat.

According to yet another aspect, a control unit may adjust one or more control parameters in response to and/or based at least partly on information indicating one or more operational states of the actively controlled seat. In some embodiments, the active seat may include one or more internal sensors which indicate operational states of the seat. In some cases, an active seat may include accessories including, but not limited to, a retractable work surface, footrest, headrest, armrest, and occupant massager. Depending on the states of these accessories (e.g., stowed or deployed, on or off, etc.) or the occupant of the seat, the may experience exhibit different resonant frequencies or vibrational noise. Accordingly, the control unit may compensate for the varying resonant frequencies of the accessories and any added noise by varying one or more control parameters. For example, if the massager is on, the massager may induce added vibration in the seat which may interfere with the detection of vibrations induced in the seat due to external disturbances, e.g., road induced disturbances. Accordingly, the control unit may filter out the added vibrations induced by the massager so that seat may identify and mitigate externally induced vibration.

According to yet another aspect, a control unit may adjust one or more control parameters in response to and/or based at least partly on input indicating one or more selected operational modes of the actively controlled seat. In some embodiments, the seat may have one or more operational modes that vary the frequency band for maximum vibration mitigation. For example, an active seat may have a writing mode which focuses vibration isolation on a writing surface in a predetermined range of frequencies.

FIG. 1 illustrates the top view of an embodiment of an adjustable active seat 1 that includes seat back 2, seat-bottom 3, fully deployed right arm rest 4 and left arm rest 5, and headrest 6. The seat in FIG. 1 is facing forwards in the direction of the positive x axis. FIG. 2 illustrates a side view of the seat in FIG. 1 with seat active suspension unit 8, and fore-aft translational adjustment mechanism 9. FIG. 3 illustrates the front view of the seat showing the left/right adjustment mechanism 10. Although not shown, the seat may also include transitional adjustment in the z direction.

The x, y, and z axes in FIGS. 1-3 are oriented in the forward, left lateral and upward vertical directions when the vehicle and seat are at rest on level ground.

FIG. 4 illustrates seat 1 of FIGS. 1-3 in three translationally distinct positions in the x direction. The seat in its predetermined base state is in position 20. In positions 21 and 22, shown in phantom, the seat is translated forward and backward respectively. In some embodiments, the seat may be placed in these or other intermediate positions by, for example, the seat occupant by using a manual or powered user interface to a position adjustment mechanism.

FIG. 5 illustrates the seat 1 of FIGS. 1-3 in at three translationally distinct positions in the y direction. The seat in its predetermined base state is in position 23. In positions 24 and 25, shown in phantom, the seat is translated to the right and the left respectively. In some embodiments, the seat may be placed in these or other intermediate positions by, for example, the seat occupant by using a manual or powered user interface to a position adjustment mechanism.

FIG. 6 illustrates the seat 1 of FIGS. 1-3 in at two rotationally distinct positions 26 and 27. The seat in its predetermined base state is in position 26. In position 27, shown in phantom, the seat is rotated in the clockwise direction about an axis parallel to the z direction.

Figure 7:
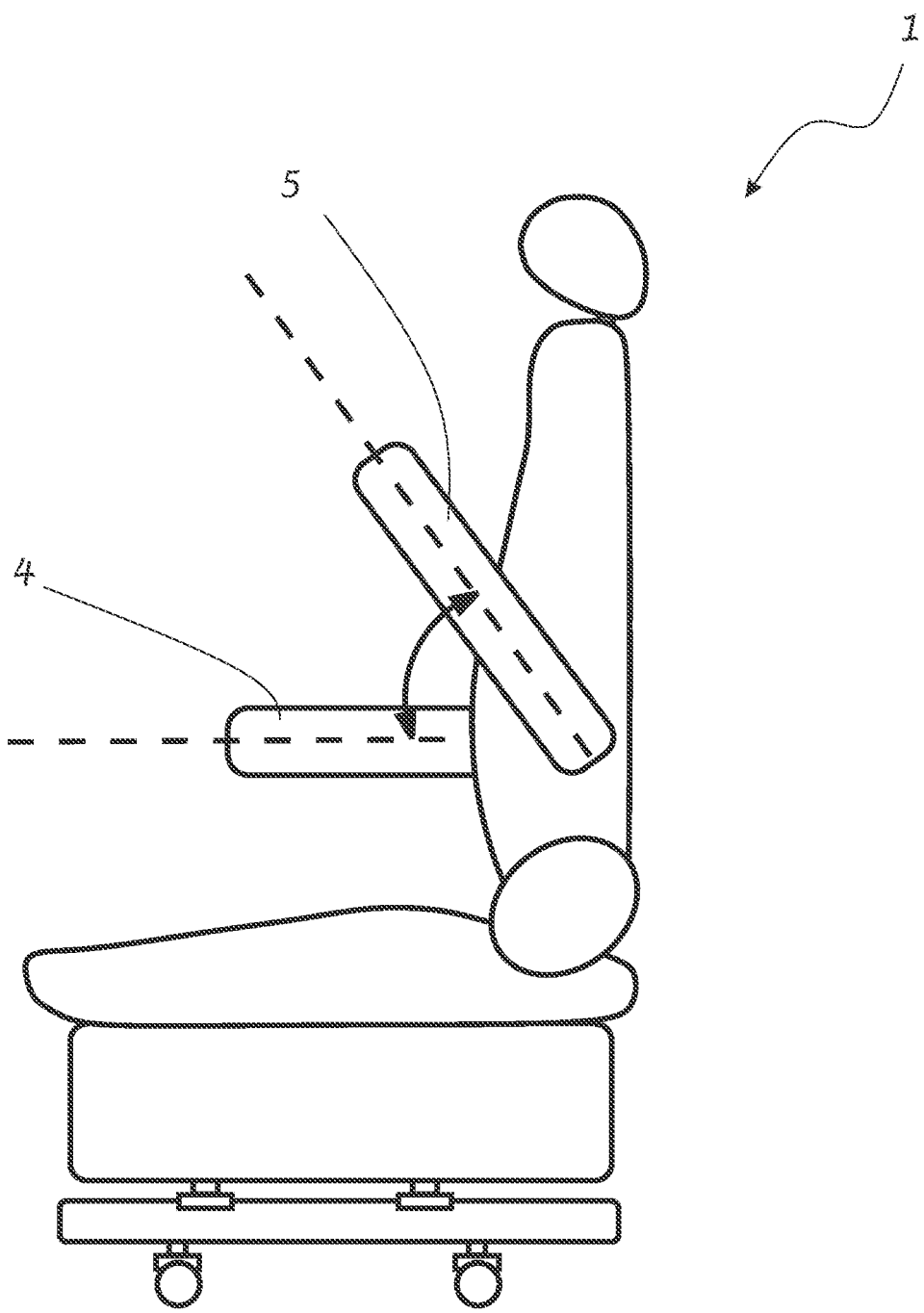
FIG. 7 is an embodiment of an adjustable active seat showing the fully and partially deployed arm rests.

FIG. 7 illustrates seat 1 of FIGS. 1-3 in a state where the configuration is distinct from that of the base state of the seat as result of the right arm rest 4 being deployed and the left arm rest 5 being stowed.

Figure 8:
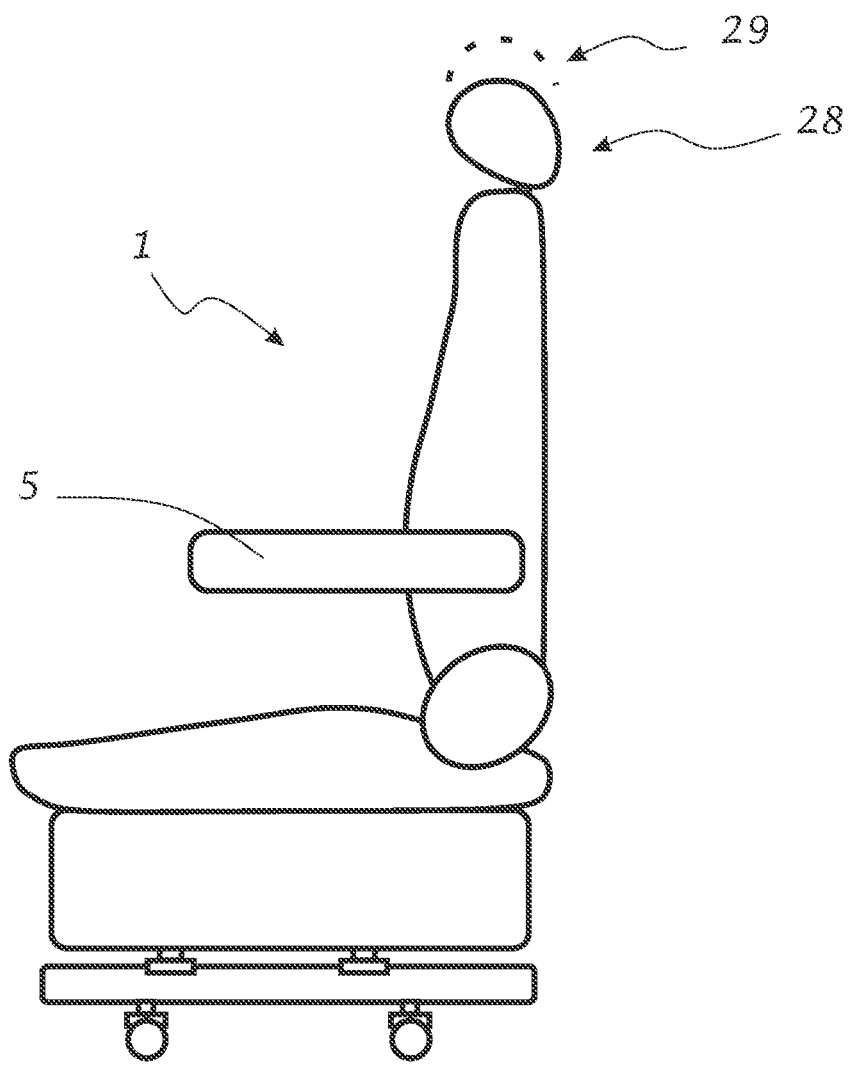
FIG. 8 is an embodiment of an adjustable active seat showing two translationally distinct positions of the headrest.

FIG. 8 illustrates seat 1 of FIGS. 1-3 in a state where the configuration is distinct from that of the base state 28 of the seat at least as a result of the headrest being deployed in an adjusted state 29.

Figure 9:
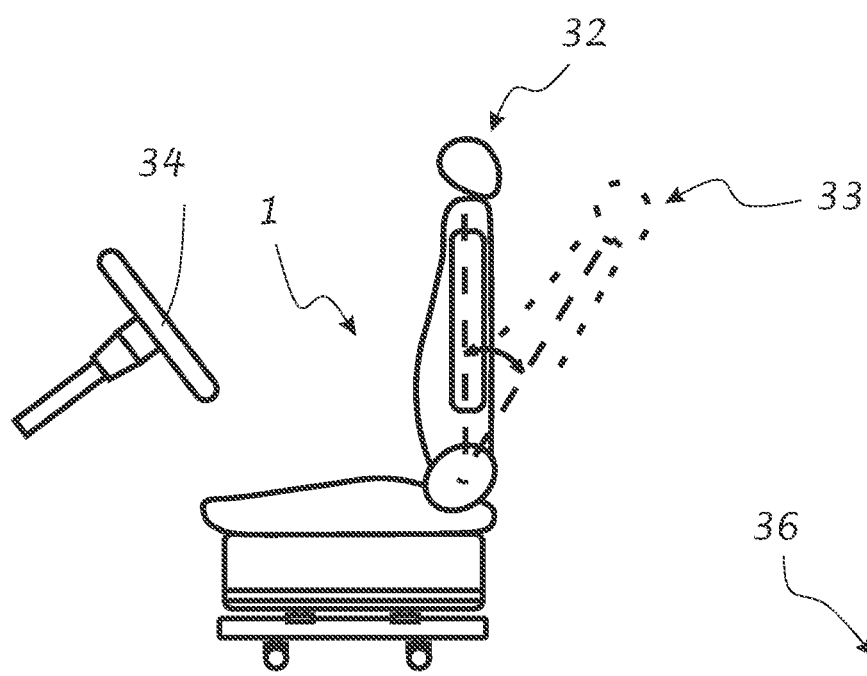
FIG. 9 is an embodiment of an adjustable active seat showing two distinct reclining positions of the seat back.
Figure 10:
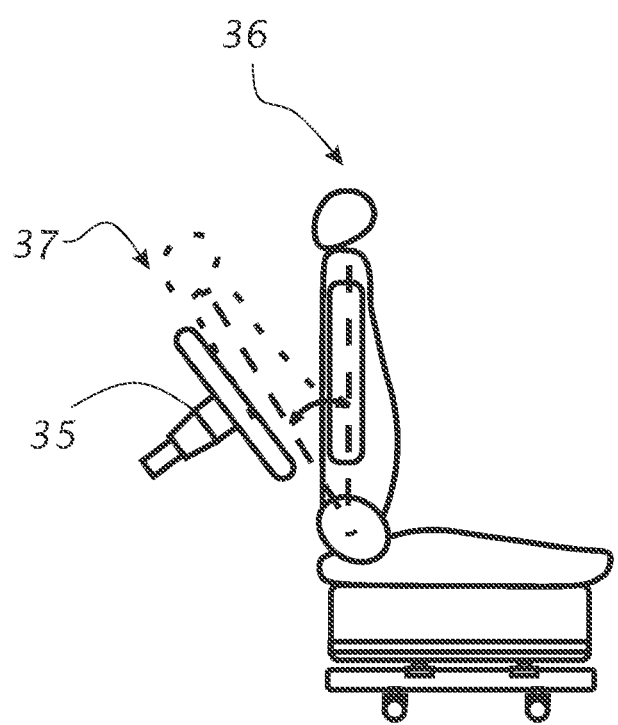
FIG. 10 is an embodiment of an adjustable active seat showing that the reclined position of the seat back from FIG. 9 will interfere with the steering wheel if the active seat is rotated about the z axis.
Figure 11:
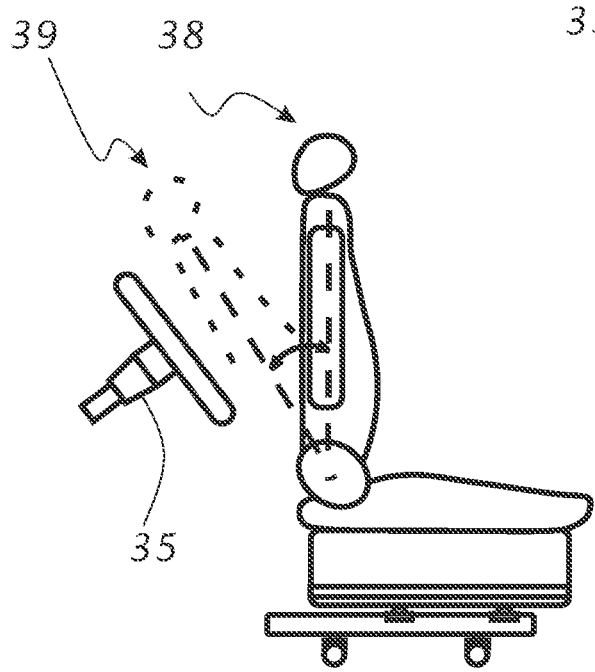
FIG. 11 is an embodiment of an adjustable active seat showing that the reclined position of FIG. 10 is possible when accompanied with a translation of the seat in the x direction.

FIG. 9 illustrates seat 1 of FIGS. 1-3 in a state where the configuration is distinct from that of the base state 32 of the seat at least as a result of the seat back being reclined in state 33. Also shown is retractable steering wheel 34. FIG. 10 illustrates that if the orientation of the reclined seat is adjusted by rotation the seat about its axis that is parallel to the z direction, the seat back will interfere with the steering wheel 14 even if retracted. However, as illustrated in FIG. 11, if the seat is translated away from the steering wheel along the z axis there is some separation between the retracted steering wheel and the back of the seat. Therefore in state 39, shown in FIG. 11, the active suspension seat may be moved, for example, in the z direction but it may be necessary to adjust some of the parameters of the seat controller so that the motion of the seat back does not exceed the available spacing between it and the retracted steering wheel. It should be noted that the spacing between the reclined seat back and the retracted steering wheel may be determined based on information about, for example the configuration and the orientation of seat, the translational position of the seat, the angle of tilt of the seat back (which may be obtained by using internal sensors), and the position of the steering wheel based on external sensors (for example, a linear displacement sensor such as a linear variable differential transformer (LVDT) or a potentiometer). Other sensor types and combinations of internal and external sensors may be used as the disclosure is not so limited.

Figure 12:
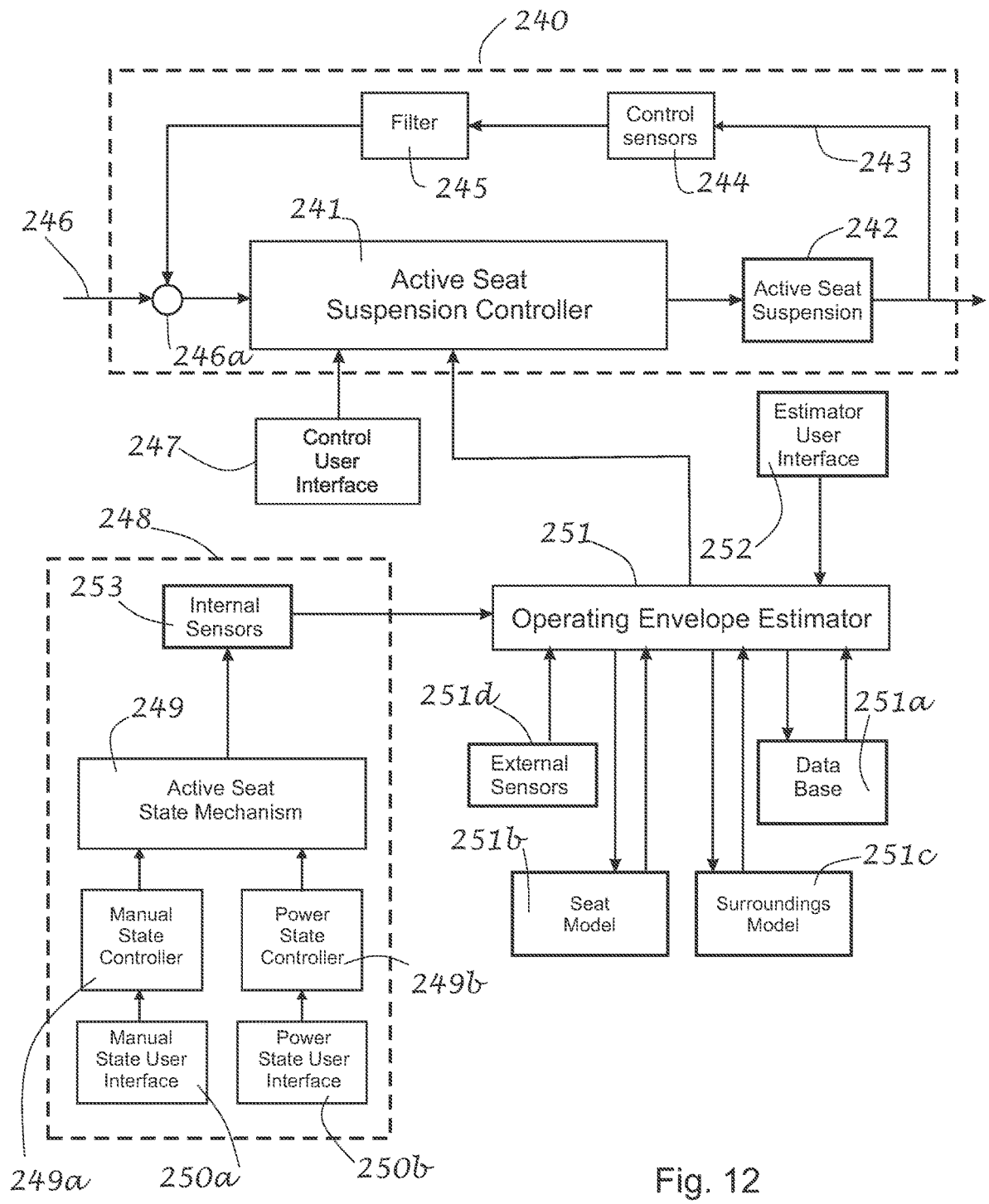
FIG. 12 is a block diagram of one embodiment of an active seat control system.

FIG. 12 is a block diagram of one embodiment of a seat control system 240, with controller 241, for an active seat 242. The control system 240 may include a feedback loop 243 with one or more control sensors 244 and filters 245. The one or more inputs may be supplied to the controller 241 which provides a command signal to the active seat suspension 242. A constant or variable reference 246 may also be provided to the comparator 246a. In some embodiments, a control user interface 247 may be used, by for example an occupant of the seat, to adjust one or more parameters of the controller 241. These parameters, may for example, alter the instantaneous roll center of the seat in the absolute reference frame and/or the maximum heave motion of the seat relative to the vehicle. Alternatively or additionally, a user interface may be used to adjust one or more aspect of the motion of the seat in the absolute reference frame or the reference frame of the vehicle. For example, the control user interface may be used to set a maximum displacement in the z direction relative to a portion of the vehicle floor proximate to the seat or to a foot pedal if the seat is a driver seat, a maximum acceleration of the seat relative to the vehicle, maximum roll angle of the seat relative to the vehicle, maximum rate of change of the roll angle relative to the vehicle.

As discussed above, the state of the active seat may be adjusted by using an active seat state adjustment system 248 shown in FIG. 12 The state adjustment system 248 may include a seat state mechanism 249 that may be controlled by a manual state controller 249a and/or a power state controller 249b which may receive inputs from a manual state user interface or a power state user interface respectively. For example, some embodiments of an adjustable active seat may include a power adjustment mechanism (i.e., a power state controller) for adjusting the translational position of the seat along an axis parallel to the x direction and a manual state controller to adjust the rotational position of the seat about an axis parallel to the z direction. In some embodiments, when the state of an adjustable active seat is changed from a first state to a second state, by for example using one or more user interfaces, information about the alteration, about the second state, and/or about objects and or persons proximate to the seat, may be collect by, for example: internal sensors, that may be attached to the at least a portion of the seat, and/or sensors that are remotely mounted from the seat. As used herein, proximate to the seat shall mean close enough to be touched or disturbed by the motion of the seat relative to the vehicle. At least some of this information may be provided to an operating envelope estimator 251 that may determine one or more values of one or more parameters of the controller 241 to, for example, preclude the seat, when it is being controlled by the controller 241, from colliding with or interfere with another object or person. In some embodiments, the operating envelope estimator may also collect information from a user interface 252. Alternatively or additionally, the estimator may also obtain information about desirable ranges of possible motion, in one or more degrees of freedom, at a particular state of the seat and the surroundings from one or more of a database 251a, a seat model 251b, such as a numerical or an empirical kinematic model of the seat and/or a model of the surroundings 251c. The operating envelope estimator 251 may use some or all of the information obtained from the internal sensors 253, the external sensors 251d, the seat model 251b, the surroundings model, and/or the database to alter one or more of the parameters of the active seat controller 241, an/or to alter one or more aspects of the motion of the operation of the active seat in response to the control sensors 241a. For example, in some embodiments, the envelope estimator 251 may obtain information about at least one aspect of the position of the seat, at least one aspect of the orientation of the seat, and at least one aspect of the configuration of the seat. Based at least partially on this information and/or other information from, for example, external sensors, models and/or a database, the operating envelope estimator may set maximum values for one or more aspects of the motion of the seat by adjusting the value of one or more parameters of the operating envelope controller. The one or more aspects of the motion of the seat may include, for example, maximum roll degree, maximum heave and/or maximum pitch. Limitation or adjustment of other aspects of the motion of the seat, under the control of the suspension controller 241, are contemplated as the disclosure is not so limited. The at least one aspect of position may be, for example, translation in the z, x and/or y directions in response to an input from a user interface. Aspects of the configuration of the seat may include one or more of the angle of inclination of the seat back, the position of an arm rest, the position of the headrest and/or the position of a deployable work surface or a foot rest. Other aspects of the configuration of the seat are contemplated as the disclosure is not so limited.

Figure 13:
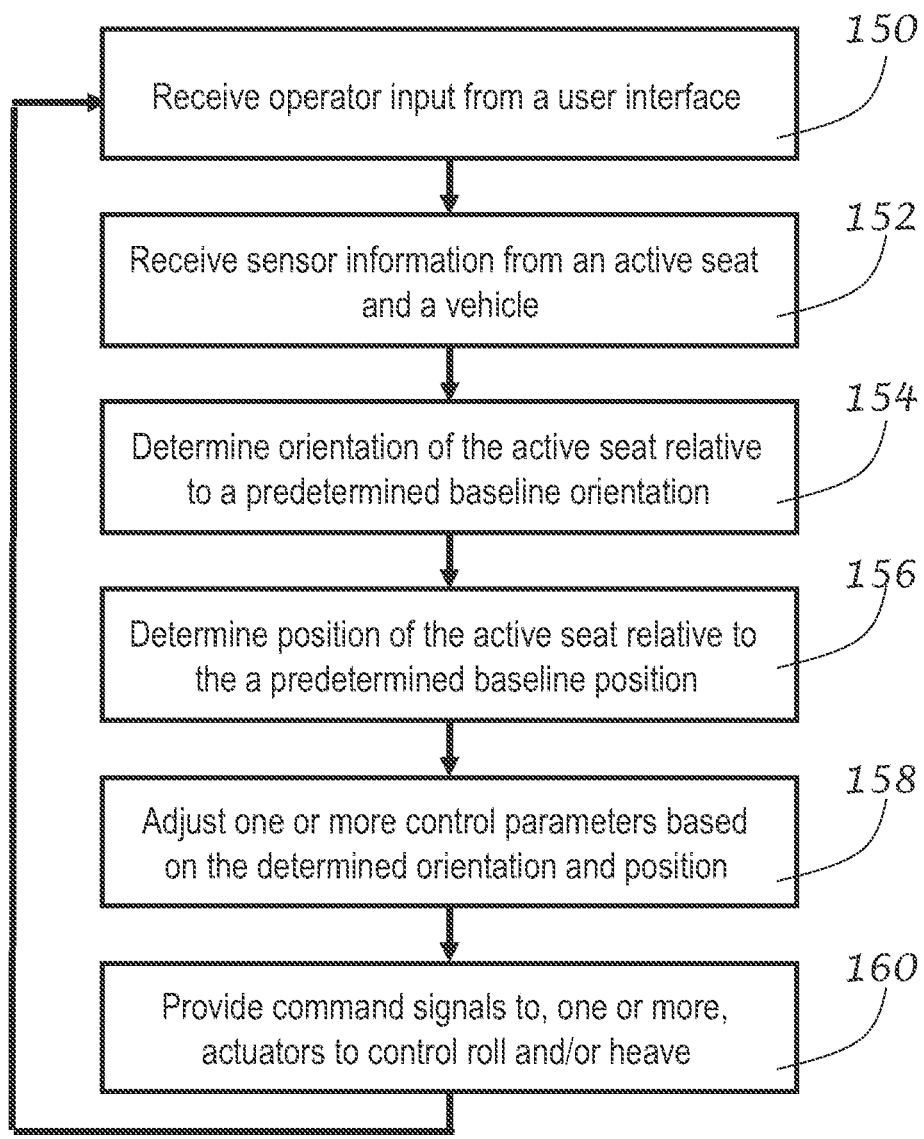
FIG. 13 is a block diagram of one embodiment of a method for controlling an adjustable active seat.

FIG. 13 is a block diagram of one embodiment for a method of controlling an active seat. As shown at block 150, operator input is received from a user interface. The operator input may be, for example, a mode selection, or it may be an on or off switch. At block 152, sensor information is received from an active seat and a vehicle. The sensor information may incorporate internal sensors 253 or external sensors 251d. In block 154, the sensor information received in block 152 is used to determine the orientation of the active seat from a predetermined baseline state. As discussed previously, the orientation refers to rotation of the seat, relative to the vehicle, about an axis parallel to the z direction. In block 156, the position of the active seat is determined relative to the predetermined baseline state. The position of the seat may be determined relative to the vehicle, and may represent a shift in three-dimensional space from predetermined baseline state in the vehicle. Based on the position and orientation of the seat, one or more control parameters may be adjusted at block 158. At block 160, the command signal is provided to the active seat to control the seat in at least one degree of freedom, e.g., heave, roll, pitch. As shown in FIG. 13, the method restarts from block 160 to 150 and may be a continuous process. In some embodiments, block 150 may be eliminated under certain operating conditions.

Figure 14:
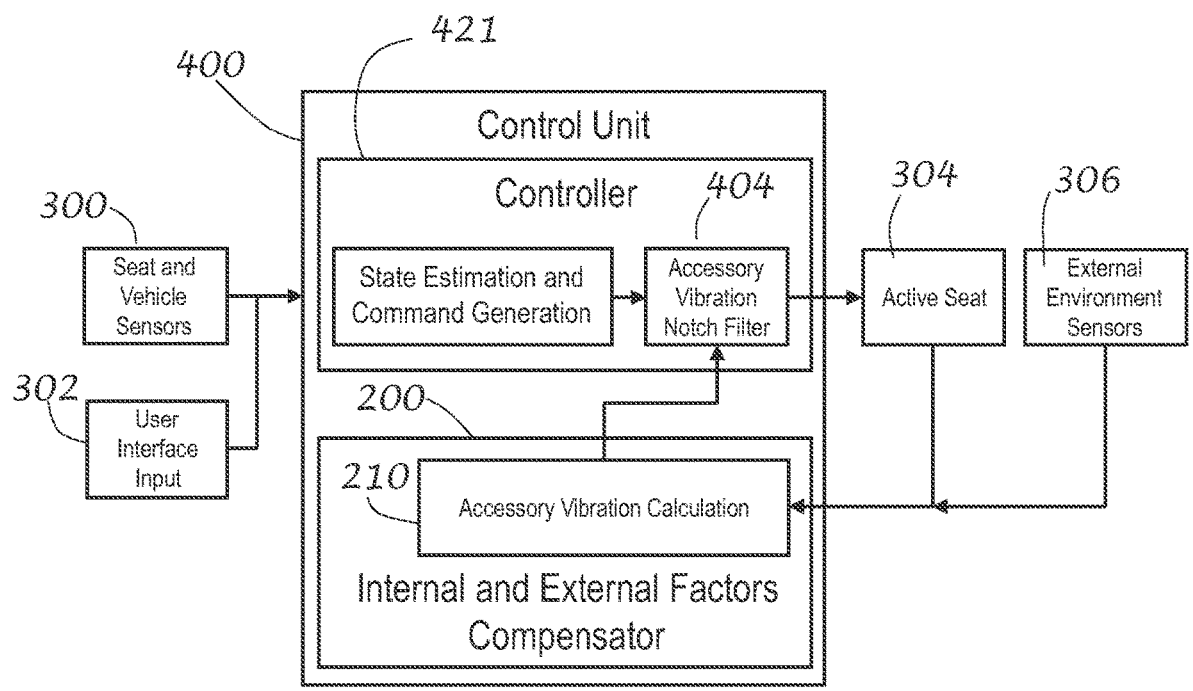
FIG. 14 is a block diagram of another embodiment of a control unit for an adjustable active seat.

FIG. 14 is a block diagram of another embodiment of a control unit 400 for an active seat. The control unit 400 controls active seat 304, and feedback is provided by the active seat and external environment sensors 306 to the Internal and External Factors Compensator (IEFC) 200. According to the embodiment shown in FIG. 14, the IEFC includes an accessory vibration calculation 210 and the control unit includes an accessory vibration notch filter 404. The accessory vibration calculation determines frequencies of vibration that may be caused by one or more accessories. For example, a massager may induce vibration in the active seat at a particular frequency or frequency range. Accordingly, the accessory vibration calculation 210 determines these frequencies and provides information about the determined frequencies to the accessory vibration notch filter 404. The accessory vibration notch filter 404 filters out any command or command signals that may cause the active seat to respond to the vibrations that may be induced by the one or more accessories. Thus, the active seat may control and isolate vibrations caused by external disturbances on the vehicle while ignoring the vibrations induced by the accessories.

Figure 15:
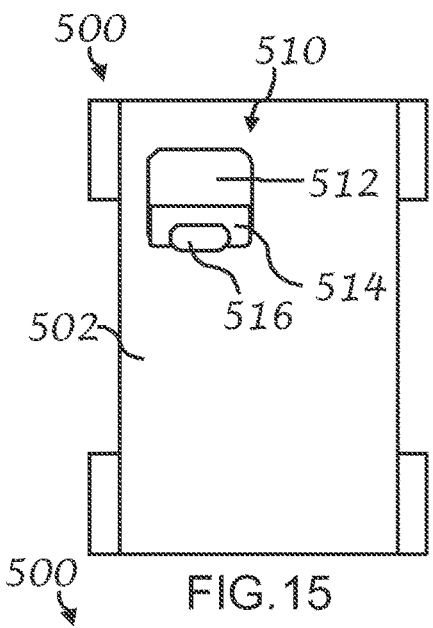
FIGS. 15-20 depict one embodiment of an adjustable active seat configured to translate and/or swivel relative to the base state.

FIGS. 15-20 depict one embodiment of an active seat 510 in a vehicle 500. As seen in FIG. 15, the active seat 510 is in a previously defined base state. The active seat includes a seat bottom 512, seat back 514, and a headrest 516.

According to the depicted embodiment the active seat 510 is configured to translate and/or swivel relative to the base state shown in FIG. 15. More specifically, seat 510 may move relative to the passenger compartment 502 of the vehicle 500. The active seat 510 is suspended by an active suspension system (not shown in the figure).

Figure 18:
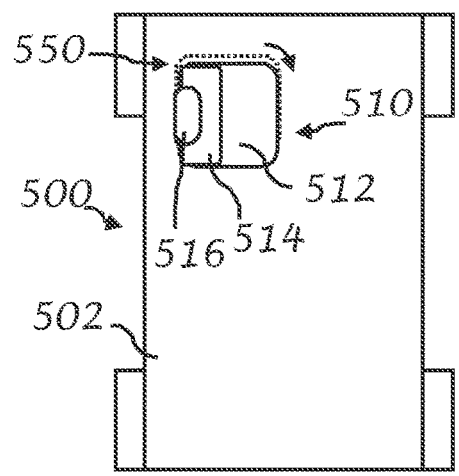

In some embodiments, the active suspension system remains fixed relative to the vehicle while the seat (i.e., seat bottom 512, seat back 514, and headrest 516) moves relative to the vehicle and the suspension system. In this embodiment, seat motion axes as controlled by the active suspension may remain fixed relative to the vehicle but move relative to seat 510. Accordingly, if the seat is swiveled by ninety degrees (as shown in FIG. 18) but the active suspension remains fixed relative to the vehicle, the seat may still respond to external induced motion (e.g., roll) based on the fixed axes. For example, if the active suspension system is configured to respond to roll by reducing the side-to-side head-toss of an occupant, in the adjusted state in FIG. 18 the seat may respond to the same input by reducing front-to-back head motion, i.e., pitch. In some embodiments, internal or external sensors may be used to adjust one or more control parameters based on orientation change of the seat relative to the active suspension system. For example, motion limits, gains, and other parameters may be adjusted depending how the seat is oriented to improve occupant comfort and vibration isolation. For example, in some embodiments, it may be desirable to use different maximum motion limits when the seat is in the position shown in FIG. 15 (i.e., where the seat rolls when the vehicle rolls) as opposed to when it is in position shown in FIG. 18 (where the seat pitches when the vehicle rolls).

In some embodiments, when the seat moves, the active suspension system moves (e.g., translation or rotation) with the seat such that one or more axes of motion of the seat suspension system move correspondingly. For example, if the seat swivels ninety degrees, the active suspension system also swivels ninety degrees, thereby changing the axes of motion for any actuator or transmission elements in the active suspension. Accordingly, in this embodiment, the axes of the seat suspension and the occupant remain aligned, but those axes are offset or otherwise different from the axes of the seat when it is in its base state. Thus, a seat control unit may correct for the altered state by applying an axes transformation to a control signal output. For example, in the case of a ninety degree rotation of the seat, the axis of the seat used in responding to vehicle roll may be transformed ninety degrees when responding to vehicle pitch. For example, roll motion of the seat may be used when responding to vehicle pitch while pitch motion of the seat may be used when responding to vehicle roll. The control parameters may also be adjusted, scaled, or recalculated for the new state of the seat. For example, a larger gain for the command signal may be desirable to keep the head still with same amount of gyro rate along seat axes when the seat is rotated. The axes transformation may be applied continuously in a range of offset positions of the seat from the base state such that one or more control parameters may be adjusted and vibration isolation maintained, as the present disclosure is not so limited.

Figure 16:
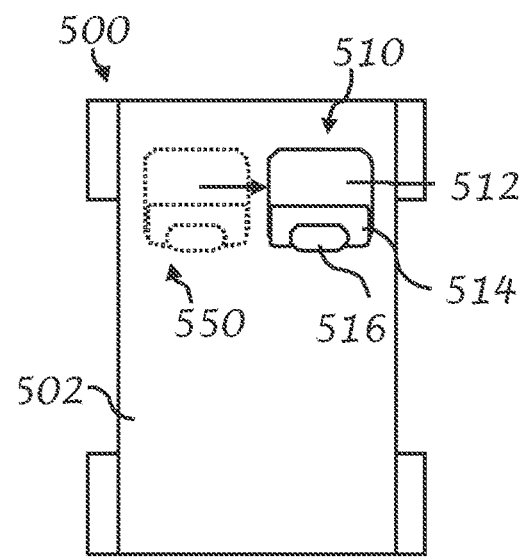

FIG. 16 shows an example of active seat 510 translating in a lateral or y direction relative to the passenger compartment 502 of the vehicle 500. The translation of seat 510 is illustrated relative to the vehicle 500 and the base state 550 of the seat, shown in phantom in FIG. 16. According to this example, the primary axes of motion of seat 510 remain parallel with the axes of the base state. In some embodiments, the control unit may adjust various control parameters, such as gains and maximum motion limits, in the new position to, for example, account for the change in the distance between the roll axis of the seat and the roll axis of the vehicle. Alternatively or additionally, the limits for control of seat 510 in roll may be adjusted to compensate for the seat being closer to the right side of the passenger compartment 502 and further from the left side. Alternatively or additionally, the gain for heave may be adjusted, for example, because the direction and magnitude of motion of the seat when the vehicle pitches or rolls is dependent on the position of the seat relative to the roll axis of the vehicle. For example, the heave control may be adjusted for a given vehicle roll relative to the base state 550 as the given vehicle roll will induce different vertical displacements on the seat based on position in the vehicle passenger compartment 502.

Figure 17:
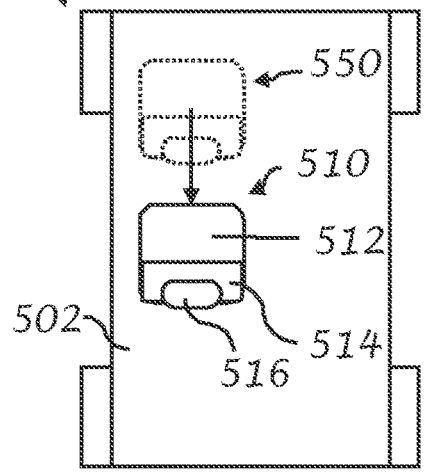

FIG. 17 shows another example of active seat 510 translating in the passenger compartment 502, in a longitudinal or x direction of the vehicle 500. Seat 510 is translated rearward in the passenger compartment 502 relative to base state 550 shown in phantom. According to this example, one or more control parameters, such as for example, gain may be adjusted based on the new position of seat 510. In some embodiments, the gain of heave control may be adjusted based on the longitudinal position of seat 510. Without wishing to be bound by theory, it may be desirable to reduce gain as the seat moves closer or further from the vehicle pitch axis, where the seat may experience lower magnitude displacements for a given vehicle pitch.

Figure 19:
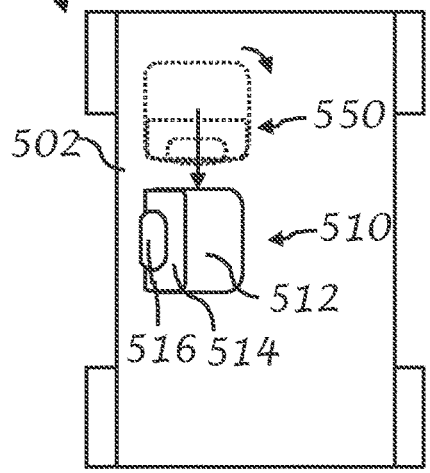

FIG. 19 shows an example of the active seat 510 swiveling (i.e., rotating about an axis parallel to the z direction) and translating in a longitudinal or x direction of the passenger compartment 502 of the vehicle 500. According to this example, the control unit for the seat may combine the transformations and adjustments performed for the examples of FIGS. 17 and 18 to compensate for both the longitudinal translation and rotation. In some embodiments, an axes transformation may be applied to the adjusted gain values and limits based the translation. In other embodiments, the axes transformation may be applied before the gains and limits are adjusted.

Figure 20:
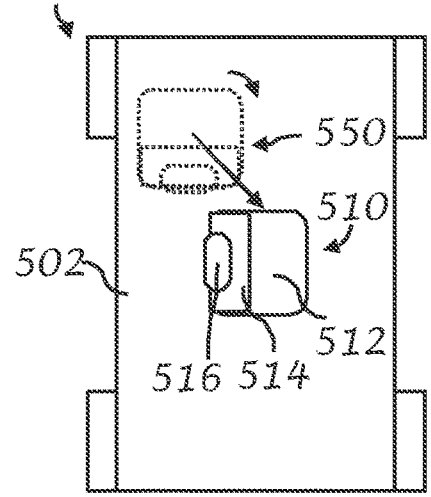

FIG. 20 shows an example of the active seat 510 swiveling and translating in both the longitudinal and the transverse direction of the passenger compartment 502 of the vehicle 500. According to this example, the control unit may adjust the control parameters and apply an axes transformation similar to a combination of the examples shown in FIGS. 16, 17, and 18. Without wishing to be bound by theory, the adjustment to the control parameters and axes transformation may scale appropriately in as the seat is moved in one or more directions. Accordingly, for a given position of seat 510 in the passenger compartment 502, suitable control axes, gains, and soft limits will be employed for control of the seat.

In some embodiments, one or more internal or external sensors may be used to collect information that indicates the position of the seat. For example, linear potentiometers or other distance sensors, such as for example, ultrasonic or optical distance measurement sensors may be used to determine the distance the seat has moved from the base state. Sensors may also be used to collect information about the rotation of the seat about an axis in the z direction. For example, a potentiometer or rotary encoder may be used to determine an angle to which the seat has been swiveled relative to the base state. Of course, any suitable internal or external sensors may be used to determine the position and orientation of the seat as the present disclosure is not so limited.

Figure 21:
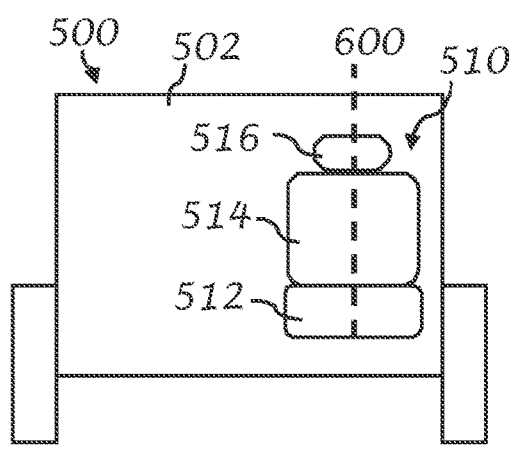
FIGS. 21-24 show a front, cross sectional view of a vehicle with an adjustable active seat in distinct roll positions and with distinct headrest positions.
Figure 22:
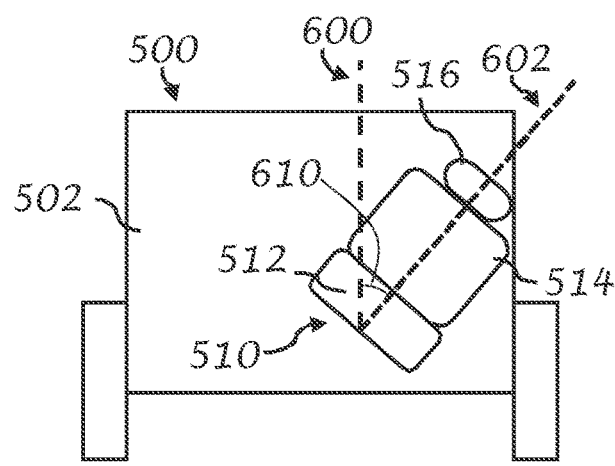
Figure 23:
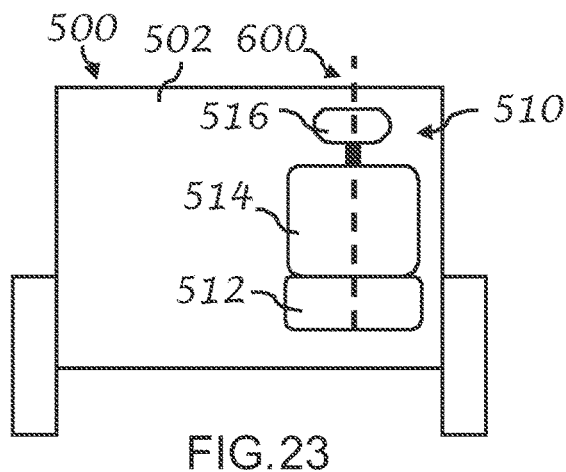
Figure 24:
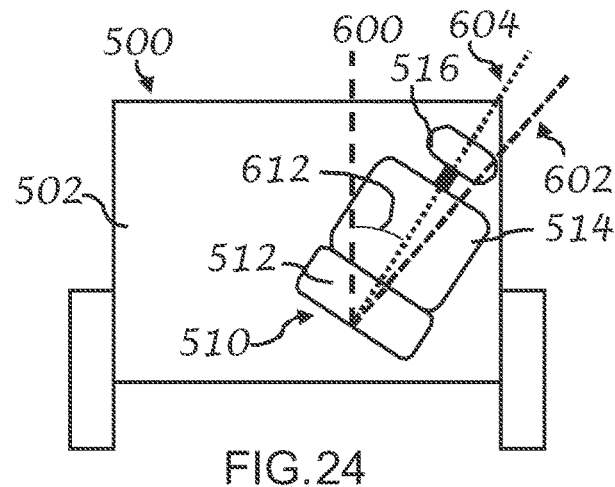

FIGS. 21-24 illustrate a front view, cross-section of a vehicle 500 with an active seat 510. FIGS. 21 and 22 show the seat in two different roll positions when the seat is in a base state. FIGS. 23 and 24 show a second state of seat 510, in two different roll positions, where the headrest has been deployed. In this embodiment, seat 510 includes a seat bottom 512, seat back 514, and headrest 516. The active suspension controller of seat 510 (not shown) is arranged to respond to the roll of the vehicle 500.

In some embodiments, the motion of a seat may be limited by both hard limits and soft limits. Hard limits are limits imposed by the maximum physical range of motion of any actuators or transmission elements of the active suspension of the seat. Hard limits are limits that cannot be physically exceeded during normal operation, while soft limits are limits imposed by software, so that the seat is able to physically move past the soft limit, but the control unit restricts the seat movement to a specific range to avoid interfering with or impacting other vehicle components.

FIG. 21 shows seat 510 in a base state. Seat 510 is in vertical alignment with its vertical axis 600. As shown in FIG. 22, the seat has rotated relative to vertical axis 600 by angle 610. As shown in FIG. 22, the angle 610 represents a soft limit that may be imposed by a control unit on the seat such that the seat does not impact the sides of the passenger compartment 502. Based on the position of other characteristics of the seat, the soft limits of the seat may be adjusted to prevent contact of the seat with other items.

FIGS. 23-24 illustrate the active seat 510 and vehicle of FIGS. 21 and 22 with a headrest 516 in a deployed position. As shown in FIG. 24, the angle 612 at which the seat 510, with the headrest 516 extended, will impact the side of the vehicle is smaller than angle 610. Thus, in the embodiment shown in FIGS. 21-24, when the headrest is extended, the soft limits may be adjusted by the control unit to prevent the seat from impacting the vehicle passenger compartment 502 during operation. In some embodiments internal sensors in seat 510 may be used to provide information to the control unit indicating the position or state of accessories like the headrest 516. For example, a linear potentiometer may be used to provide information about the position of the headrest which can be used to adjust the soft limits of the seat when the headrest is deployed. Any suitable sensor may be employed to provide information to the control unit such that one or more control parameters may be updated, as the present disclosure is not so limited.

Figure 25:
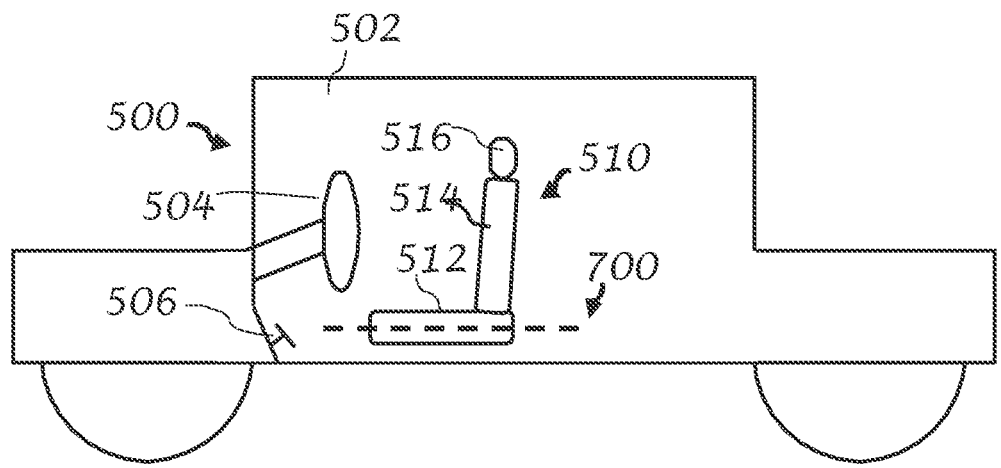
FIGS. 25-27 show a side, cross sectional view of a vehicle with an adjustable active seat in distinct pitch positions.
Figure 26:
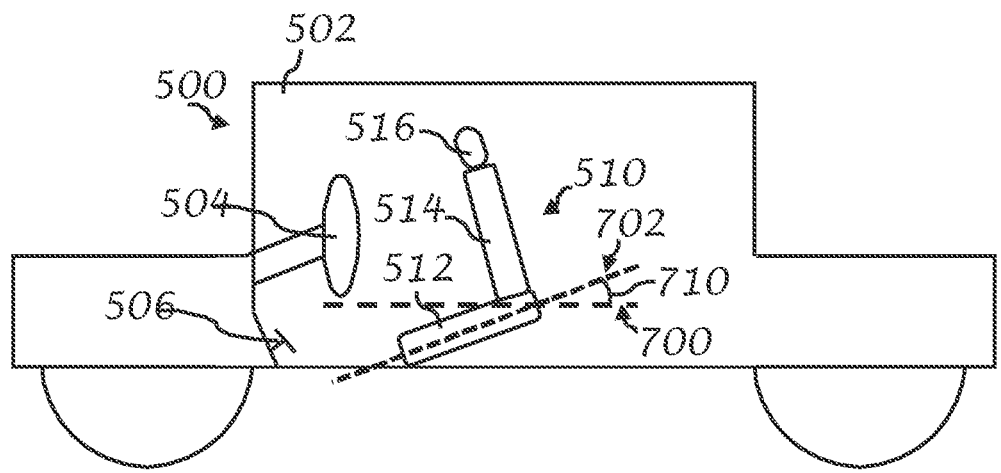
Figure 27:
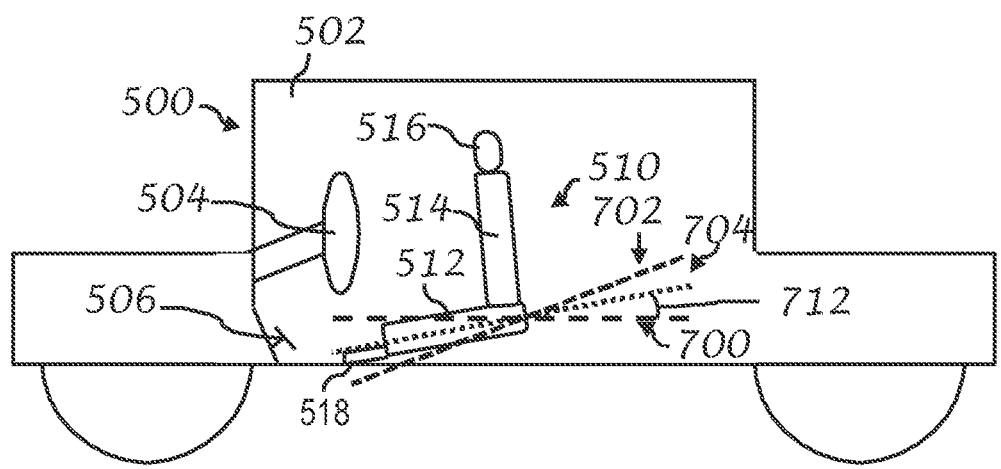

FIGS. 25-27 depict yet another embodiment of an active seat 510 in a passenger compartment 502 of vehicle 500. The seat includes a seat bottom 512, seat back 514, and a headrest 516. The seat also includes a storable footrest 518 (see FIG. 27) which may be stowed below the seat bottom 512 when not in use. As shown in FIGS. 25-27, seat 510 may respond to certain pitch disturbances of the vehicle 500 by pitching the seat relative to the vehicle about its pitch axis (not shown). In FIG. 25, the seat is in a base state, where the footrest 518 is retracted there is no rotation about the seat's pitch axis such that the bottom of the seat bottom 512 is aligned with reference line 700.

In FIG. 26, seat 510 is pitched forward by the seat suspension to a maximum pitch angle relative to the vehicle body, the seat bottom 512 is aligned with a second reference line 702. The first and second axes form an angle 710. The angle 710 may be determined by the soft limit imposed by the control unit controlling the seat so that the seat does not, for example, impact the floor of the vehicle passenger compartment 502.

As shown in FIG. 27, the footrest 518 is deployed and, for at least that reason, the seat is in a second state that different than its base state. In this state, the range of pitch motion, relative the vehicle body, may be further limited because of the possibility of interference of the deployed footrest with the vehicle body (See FIG. 27). In the second state, when the foot rest is deployed, at the maximum pitch angle relative to the vehicle 712, defined by the angle between reference line 704, aligned with the seat bottom at its maximum pitch, and reference line 704. Angle 712 is smaller than angle 710. Accordingly, when the controller receives information that footrest is deployed, it may adjust the soft limits of seat 510 so that the seat does not impact the vehicle passenger compartment 502 or other vehicle components.

In some embodiments, seat 510 may include internal sensors which detect one or more accessory states of seat 510. For example, internal sensors may detect whether the footrest 518 is deployed or stored or may even detect the exact position of the footrest if it is adjustable. Accordingly, the internal sensors may provide information about the relative or absolute position of an accessory to the control unit. The internal sensors may gather accessory state information including, but not limited to, headrest position, footrest position, and armrest position. In some embodiments, external sensors in the vehicle may gather information about the position of portions of the vehicle passenger compartment and vehicular components. For example, sensors in the steering wheel 504 and the pedals 506 may be used to provide position information to the control unit to update soft limits of the seat. Thus, even if vehicular components are adjusted or moved the seat controller may be adjust its operational parameters or envelope accordingly and avoid impacting any part of the vehicle.

In some embodiments, a seat occupant may lose direct physical contact with the vehicle passenger compartment 502 when the when the footrest 518 is in use. Without wishing to be bound by theory, the loss of contact with the vehicle passenger compartment may better isolate the driver by reducing the transmission of vibrations to the feet of an occupant of the seat but may also impede the occupant's ability to keep the body stable on the seat in the presence of certain lateral accelerations and roll motions of vehicle 500. Accordingly, in some embodiments, the control unit may increase the gain and scaling factors controlling seat 510 in response to any vehicle displacement, as a result of changes in the state of the active seat. In some cases, the vibration isolation of the seat is limited based on a driving status. In some embodiments, the isolation of the driver's seat may be reduced when sensors that can detect that the occupant of the seat is actually driving the vehicle. In some embodiments, if the occupant is no longer driving, the control unit may increase the soft limits and gain of the seat control so that the seat can provide increased isolation.

In some embodiments, one or more accessories (e.g., footrest 518) may induce resonant frequencies in seat 510 depending on their position relative to the base state. Accordingly, in some embodiments, it is desirable for the control unit to disregard these resonant frequencies induced by the seat itself. Thus, the one or more accessory states may activate or deactivate filters in the control unit or otherwise adjust control parameters to disregard a signal produced by an accessory. In other embodiments, the control unit may mitigate transmission of any resonant frequency to the occupant by adjusting one or more control parameters to compensate for the vibration due to an accessory.

In some embodiments, an active seat and vehicle may be adjusted in a variety of ways to suit a particular seat occupant, including, but not limited to back tilt adjustment, armrest position change, seat bottom height setting, attached work surface position adjustment, headrest position, lumbar adjustments, and cushion adjustments. Such adjustments may alter the dynamics of the seat when it is occupied or empty. Such adjustments may also alter, for example, the space occupied by the seat, weight distribution of the seat, among other characteristics. Accordingly, the seat control unit may adjust control parameters for account for these changes in order to, for example, avoid impacting any part of the vehicle such as the dashboard, steering wheel, center console, vehicle structural components, and other seats.

In some embodiments, a control unit for the seat may incorporate external or internal sensor information indicating the state of safety equipment. For example, the control unit may deactivate the seat if a seat belt is not active (i.e., fastened). As another example, the seat may be deactivated by the control unit if there is an empty seat as detected by one or more pressure sensors. As another example the seat may vibrate, indicating the driver to fasten the seatbelt, if it is not fastened and the vehicle is moving. Of course, sensor information may be incorporated from any safety equipment installed in the vehicle or seat, as the present disclosure is not so limited.

In some embodiments, external sensors installed in the vehicle may provide position information of the seat, seat accessories, vehicle components, cargo items, and occupants in the vehicle. An optical sensor or scanner may be used to map the vehicle passenger compartment, thereby determining the relative positioning of items in the passenger compartment and using that information for feedback control and to adjust one or more control parameters. The sensors used may be an ultrasonic sensor, stereoscopic camera, range camera, light detecting and ranging (LIDAR) device, or any other suitable sensor for mapping the vehicle passenger compartment. As objects in the vehicle passenger compartment are mapped in near real-time, the soft limits, gains, and other control parameters may be continuously adjusted such that the seat avoids collisions with nearby objects and effectively isolates vibrations experienced by the seat occupant. In some embodiments, external sensor information is received by the vehicle suspension, such that the seat may preemptively react to expected disturbances. For example, in a forward moving vehicle, the control unit may ready the seat suspension for the impact from the rear wheels of the vehicle after the impact is sensed on the front wheels. Accordingly, by incorporating suspension information from the vehicle the control unit may better forecast disturbances received by the seat so the seat suspension may be used more effectively to isolate the vibrations. In some embodiments, the control unit may adjust control parameters in response to the direction of the vehicle motion. For example, in a backward moving vehicle the control unit may receive information from the rear wheels of the vehicle and anticipate the same or similar disturbance occurring at the front wheels to prepare the seat suspension and better isolate vibration.

In some embodiments, the control unit may receive operator input from a user interface which may indicate one or more modes of operation. In some cases it may be desirable to operate an active seat differently for a child occupant than for an adult occupant. Without wishing to be bound by theory, it may be beneficial for the seat to respond primarily to high frequency events at a rapid response rate as opposed to general low-frequency vibration isolation. Accordingly, in some embodiments, the user interface may provide an option for an operator to select a child mode where the seat primarily responds to high frequency events at the cost of low-frequency vibration isolation, in order to preserve available envelope to respond to these vibrations. In some cases, it may be beneficial for a seat to have a child sleep mode. Without wishing to be bound by theory, rocking motions may induce or aid sleep in children. Accordingly, the user interface may provide a child sleep mode option where the seat rocks back and forth a transverse or longitudinal direction to aid a child's sleep. In some embodiments, the user interface may provide an option for an operator to select a writing mode where the seat focuses vibration isolation on a desk or other writing surface integrated with the seat or vehicle. Of course, the user interface may provide any suitable mode for operation of the active seat, as the present disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for controlling one or more actuators of an active seat suspension, the one or more actuators arranged to actively suspend a seat in a vehicle, the method comprising:
    determining an orientation of the seat;
    determining a limit of motion of the seat based at least in part on the orientation of the seat to avoid a collision and/or an interference with another object in the vehicle;
    determining a command signal based at least in part on the determined limit of motion;
    providing the command signal to the one or more actuators of the active seat suspension;
    operating the one or more actuators in accordance with the command signal.

2. The method of claim 1, further comprising:
    determining a position of one or more items contained within a passenger compartment of the vehicle, and wherein the command signal is determined based at least in part on the position of the one or more items.

3. The method of claim 2, further comprising receiving information from an external sensor, and wherein the position of the one or more items is determined based in part on the received information.

4. The method of claim 3, wherein the one or more items includes at least one of: a steering wheel and a pedal.

5. The method of claim 3, wherein the external sensor is a three dimensional scanner, and wherein the method further comprises creating a map of at least a portion of the passenger compartment, wherein the control signal is determined based at least partly on the map.

6. The method of claim 5, wherein the three dimensional scanner is one of an ultrasonic sensor, stereoscopic camera, range camera, and light detecting and ranging (LIDAR) device.

7. The method of claim 2, wherein the one or more items includes an occupant of another seat of the vehicle.

8. The method of claim 1, further comprising detecting a configuration of the seat, wherein the command signal is determined based at least in part on the determined configuration.

9. The method of claim 1, further comprising detecting at least one of:
    a position of an armrest, a position of a footrest, a position of a headrest, and a position of a desk relative to the seat, and wherein the command signal is determined based at least in part on the at least one of: the position of an armrest, the position of a footrest, the position of a headrest, and the position of a desk relative to the seat.

10. The method of claim 1, further comprising detecting a status of a seat massager of the seat, and wherein the command signal is determined based on the status of the seat massager.

11. The method of claim 1, further comprising detecting an angle of reclination between a seat bottom and a seat back of the seat, wherein the command signal is determined based on the angle of reclination.

12. The method of claim 1, further comprising determining at least one of:
- a height of an occupant of the seat, a weight of the occupant of the seat, and a weight distribution of the occupant of the seat; and wherein the command signal is determined based at least in part on the at least one of: the height of the occupant of the seat, the weight of the occupant of the seat, and the weight distribution of the occupant of the seat.

13. The method of claim 1, further comprising determining a status of at least one of:
- an airbag, a seatbelt, and another seat of the vehicle, wherein the command signal is determined based on the determined status.

14. The method of claim 1, further comprising receiving operator input indicating one or more operational modes from a user interface, wherein the command signal is determined based at least in part on the received operator input.

15. The method of claim 1, further comprising detecting a position of the seat along a first axis and a second axis within a passenger compartment of the vehicle, wherein the first axis is orthogonal to the second axis, and wherein the command signal is determined based at least in part on the detected position of the seat.

16. The method of claim 15, further comprising:
- calculating an axes transformation based at least in part on the orientation of the seat or the position of the seat; and wherein the command signal is determined based at least partly on the axes transformation.

17. The method of claim 1, wherein the limit of motion avoids the collision and/or the interference between the seat and the other object in the vehicle.

18. The method of claim 1, wherein the limit of motion avoids the collision and/or the interference between an occupant of the seat and the other object in the vehicle.

19. The method of claim 1, wherein the other object in the vehicle is one of the following: a dashboard, a pillar, a different seat, a steering wheel, a vehicle occupant, or a cargo item.

20. A system for actively suspending a seat in a vehicle, the system comprising:
- a seat suspension including at least one actuator arranged to move the seat relative to the vehicle;
- at least one orientation sensor constructed and arranged to output orientation information representative of an orientation of the seat relative to at least one of the vehicle and the base state of the seat;
- a control unit constructed and arranged to receive information from the at least one orientation sensor, to determine a limit of motion of the seat based at least in part on the received information to avoid a collision and/or an interference with another object in the vehicle, to determine a command signal based at least in part on the determined limit of motion, and to provide the command signal to the at least one actuator of the seat suspension.

21. The system of claim 20, wherein the limit of motion avoids the collision and/or the interference between the seat and the other object in the vehicle.

22. The system of claim 20, wherein the limit of motion avoids the collision and/or the interference between an occupant of the seat and the other object in the vehicle.

23. The system of claim 20, wherein the other object in the vehicle is one of the following: a dashboard, a pillar, a different seat, a steering wheel, a vehicle occupant, or a cargo item.

24. A method for controlling one or more actuators of an active seat suspension, the one or more actuators arranged to actively suspend a seat in a vehicle, the method comprising:
- controlling the one or more actuators of the active seat suspension based at least in part on a control parameter;
- detecting a change of a state of the seat;
- in response to detecting the change of the state, modifying a value of the control parameter to generate an adjusted control parameter to avoid a collision and/or an interference with another object in the vehicle; and
- controlling the one or more actuators based at least in part on the adjusted control parameter.

25. The method of claim 24, wherein the state of the seat is an orientation of the seat.

26. The method of claim 24, wherein the adjusted control parameter avoids the collision and/or the interference between the seat and the other object in the vehicle.

27. The method of claim 24, wherein the adjusted control parameter avoids the collision and/or the interference between an occupant of the seat and the other object in the vehicle.

28. The method of claim 24, wherein the other object in the vehicle is one of the following: a dashboard, a pillar, a different seat, a steering wheel, a vehicle occupant, or a cargo item.

* * * * *